(12) United States Patent
Rambosek et al.

(10) Patent No.: US 7,393,269 B2
(45) Date of Patent: *Jul. 1, 2008

(54) ABRASIVE FILTER ASSEMBLY AND METHODS OF MAKING SAME

(75) Inventors: Thomas W. Rambosek, Woodbury, MN (US); Rufus C. Sanders, Jr., Burnsville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 192 days.

This patent is subject to a terminal disclaimer.

(21) Appl. No.: 11/228,896

(22) Filed: Sep. 16, 2005

(65) Prior Publication Data

US 2007/0066198 A1   Mar. 22, 2007

(51) Int. Cl.
*B24D 11/00* (2006.01)
(52) U.S. Cl. .................. 451/533; 451/548; 451/28
(58) Field of Classification Search ................. 451/526, 451/527, 532, 533, 537, 540, 245, 297, 415, 451/441, 548, 28, 36, 41
See application file for complete search history.

(56) References Cited

U.S. PATENT DOCUMENTS

| | | |
|---|---|---|
| 1,850,413 A | 3/1932 | Porte |
| 1,862,103 A | 6/1932 | Stratford |
| 1,961,911 A | 6/1934 | Pusch |
| 2,123,581 A | 7/1938 | Anderson |
| 2,740,239 A | 4/1956 | Ball et al. |
| 2,749,681 A | 6/1956 | Reidenbach |
| 2,838,890 A | 6/1958 | McIntyre |
| 2,984,052 A | 5/1961 | Mueller, Jr. |
| 3,021,649 A | 2/1962 | Robbins |
| 3,353,308 A | 11/1967 | Zane |
| 3,420,007 A | 1/1969 | Kolesh |
| 3,861,892 A | 1/1975 | Wisdom, Jr. et al. |
| 3,932,966 A | 1/1976 | Stern |
| 4,001,366 A | 1/1977 | Brumlik |
| 4,062,152 A | 12/1977 | Mehrer |
| 4,158,935 A | 6/1979 | Robert |
| 4,282,011 A | 8/1981 | Terpay |
| 4,287,685 A | 9/1981 | Marton |

(Continued)

FOREIGN PATENT DOCUMENTS

DE    34 16 186 A1    1/1985

(Continued)

OTHER PUBLICATIONS

"robAust", Roberlo Abrasives, Copyright © 2002-2006 robAust Pty Ltd., [retrieved from the internet on Jul. 6, 2006], URL <http://www.robaust.com/shopdisplayproducts.asp?id=30&cat=Roberlo+Abrasives>, pp. 2.

(Continued)

*Primary Examiner*—Jacob K Ackun, Jr.

(57) ABSTRACT

An abrasive filter assembly with an integral dust collection system. The abrasive filter assembly comprises a porous element, a first filter media with channels, a second filter media, and an attachment interface layer. The openings of the porous element cooperate with the channels to allow the flow of particles from the porous element to the second filter media. The porous element can be an abrasive article or an attachment surface for an abrasive article.

33 Claims, 5 Drawing Sheets

U.S. PATENT DOCUMENTS

| | | | |
|---|---|---|---|
| 4,437,269 A | 3/1984 | Shaw |
| 4,590,113 A | 5/1986 | Herzog |
| 4,609,581 A | 9/1986 | Ott |
| 4,631,220 A | 12/1986 | Clifton |
| 4,645,699 A | 2/1987 | Neveu |
| 4,722,203 A | 2/1988 | Darjee |
| 4,725,487 A | 2/1988 | Pemrick et al. |
| 4,759,155 A | 7/1988 | Shaw |
| 4,844,967 A | 7/1989 | Goralski et al. |
| 4,920,702 A | 5/1990 | Kloss et al. |
| 4,932,163 A | 6/1990 | Chilton et al. |
| 4,937,984 A | 7/1990 | Taranto |
| 4,964,243 A | 10/1990 | Reiter |
| 4,964,245 A | 10/1990 | Braasch |
| 5,007,206 A | 4/1991 | Paterson |
| 5,036,627 A | 8/1991 | Walters |
| 5,131,924 A | 7/1992 | Wiand |
| 5,254,194 A | 10/1993 | Ott et al. |
| 5,256,231 A | 10/1993 | Gorman et al. |
| 5,317,886 A | 6/1994 | Prahl |
| 5,354,591 A | 10/1994 | Ott et al. |
| 5,367,839 A | 11/1994 | Pearce |
| 5,389,032 A | 2/1995 | Beardsley |
| 5,458,532 A | 10/1995 | Cannone |
| 5,490,878 A | 2/1996 | Peterson et al. |
| 5,505,747 A | 4/1996 | Chesley et al. |
| 5,533,923 A | 7/1996 | Shanouilian et al. |
| 5,560,794 A | 10/1996 | Currie et al. |
| 5,578,343 A | 11/1996 | Gaeta et al. |
| 5,607,345 A | 3/1997 | Barry et al. |
| 5,616,394 A | 4/1997 | Gorman et al. |
| 5,667,540 A | 9/1997 | Chesley et al. |
| 5,674,122 A | 10/1997 | Krech |
| 5,695,533 A | 12/1997 | Kardys et al. |
| 5,807,161 A | 9/1998 | Manor et al. |
| 5,810,650 A | 9/1998 | Jöst |
| 5,891,549 A | 4/1999 | Beretta et al. |
| 5,904,793 A | 5/1999 | Gorman et al. |
| 5,954,844 A | 9/1999 | Law et al. |
| 5,989,112 A | 11/1999 | Long et al. |
| 6,024,634 A | 2/2000 | Höglund et al. |
| 6,059,644 A | 5/2000 | Manor et al. |
| 6,074,292 A * | 6/2000 | Gilday ............ 451/533 |
| 6,077,156 A | 6/2000 | Amin et al. |
| 6,077,601 A | 6/2000 | DeVoe et al. |
| 6,190,246 B1 | 2/2001 | Parrott et al. |
| 6,197,076 B1 | 3/2001 | Braunschweig et al. |
| 6,280,824 B1 | 8/2001 | Insley et al. |
| 6,312,325 B1 | 11/2001 | Van Osenbruggen |
| 6,368,199 B1 | 4/2002 | Van Osenbruggen |
| 6,482,308 B1 | 11/2002 | Wiemann |
| 6,575,821 B2 | 6/2003 | Jöst |
| 6,579,162 B2 | 6/2003 | Chesley et al. |
| 6,613,113 B2 | 9/2003 | Minick et al. |
| 6,790,126 B2 * | 9/2004 | Wood et al. ............ 451/41 |
| 6,923,840 B2 | 8/2005 | Schutz et al. |
| 2001/0044006 A1 | 11/2001 | Kruegler |
| 2003/0003856 A1 | 1/2003 | Swei |
| 2003/0127108 A1 * | 7/2003 | Policicchio et al. ......... 134/6 |
| 2003/0143938 A1 | 7/2003 | Braunschweig et al. |
| 2003/0159363 A1 | 8/2003 | Chesley et al. |
| 2004/0098923 A1 | 5/2004 | Hood et al. |
| 2004/0109978 A1 | 6/2004 | Michel |
| 2004/0148866 A1 | 8/2004 | Krupnick |
| 2004/0166788 A1 | 8/2004 | Travis |
| 2004/0170801 A1 | 9/2004 | Seth et al. |
| 2004/0170802 A1 | 9/2004 | Seth et al. |
| 2004/0209561 A1 | 10/2004 | Suzuki et al. |
| 2005/0124274 A1 | 6/2005 | Hoglund |
| 2006/0019579 A1 | 1/2006 | Braunschweig |

FOREIGN PATENT DOCUMENTS

| | | |
|---|---|---|
| DE | 41 24 520 A1 | 1/1993 |
| DE | 201 11 245 U 1 | 8/2001 |
| EP | 0 064 748 | 8/1984 |
| EP | 0 244 934 | 11/1987 |
| EP | 0 166 060 | 9/1988 |
| EP | 0 285 042 A1 | 10/1988 |
| EP | 0 578 865 A1 | 1/1994 |
| EP | 0 738 562 | 10/1996 |
| EP | 1 488 888 A1 | 12/2004 |
| EP | 1 524 077 A1 | 4/2005 |
| EP | 1 733 844 A1 | 12/2006 |
| FR | 2 659 892 | 9/1991 |
| FR | 2 739 308 | 4/1997 |
| GB | 1137556 | 12/1968 |
| GB | 1539477 | 1/1970 |
| GB | 2 017 485 A | 10/1979 |
| GB | 2 057 483 A | 4/1981 |
| GB | 2 162 213 A | 1/1986 |
| GB | 2 199 053 A | 6/1988 |
| JP | 5-220670 | 8/1993 |
| JP | 11-179668 | 7/1999 |
| WO | WO 90/14039 | 11/1990 |
| WO | WO 96/07509 | 3/1996 |
| WO | WO 00/64634 | 11/2000 |
| WO | WO 03/020474 A1 | 3/2003 |

OTHER PUBLICATIONS

"List of Products", Roberlo United States, © Copyright 2003 Roberloroberlousa.com, roberlo.com), [retrieved from the internet on Jan. 7, 2004], URL <http://www.roberlousa.com/abrasives.htm>, pp. 2.
U.S. Appl. No. 11/321,505, Woo et al., filed Dec. 29, 2005.
U.S. Appl. No. 11/198,265, Woo et al., filed Aug. 5, 2005.
U.S. Appl. No. 11/197,798, Woo et al., filed Aug. 5, 2005.
U.S. Appl. No. 11/229,277, Woo et al., filed Sep. 16, 2005.
U.S. Appl. No. 11/229,281, Woo et al., filed Sep. 16, 2005.
U.S. Appl. No. 29/238,541, Braunschweig et al., filed Sep. 16, 2005.
U.S. Appl. No. 29/238,542, Braunschweig et al., filed Sep. 16, 2005.
U.S. Appl. No. 29/238,556, Braunschweig et al., filed Sep. 16, 2005.
U.S. Appl. No. 29/246,256, Shimizu et al., filed Mar. 28, 2006.
U.S. Appl. No. 29/246,257, Shimizu et al., filed Mar. 28, 2006.
U.S. Appl. No. 29/246,258, Shimizu et al., filed Mar. 28, 2006.
U.S. Appl. No. 29/246,259, Shimizu et al., filed Mar. 28, 2006.
U.S. Appl. No. 29/246,260, Shimizu et al., filed Mar. 28, 2006.
U.S. Appl. No. 29/246,261, Shimizu et al., filed Mar. 28, 2006.
U.S. Appl. No. 29/253,148, Braunschweig et al., filed Feb. 1, 2006.
U.S. Appl. No. 29/253,110, Braunschweig et al., filed Feb. 1, 2006.
U.S. Appl. No. 29/253,085, Braunschweig et al., filed Feb. 1, 2006.
U.S. Appl. No. 29/253,084, Braunschweig et al., filed Feb. 1, 2006.
U.S. Appl. No. 11/423,829, Sanders et al., filed Jun. 13, 2006.
U.S. Appl. No. 11/614,431, Rambosek et al., filed Dec. 21, 2006.
U.S. Appl. No. 11/688,497, Woo et al., filed Mar. 20, 2007.
U.S. Appl. No. 11/688,482, Woo et al., filed Mar. 20, 2007.

* cited by examiner

ABRASIVE FILTER ASSEMBLY AND METHODS OF MAKING SAME

FIELD OF INVENTION

The present invention relates generally to an abrasive filter assembly. More particularly, the present invention relates to an abrasive filter assembly with an integral dust collection system. The abrasive filter assembly can be in the form of an abrasive article or an abrasive article mounting assembly that can releasably engage an abrasive article.

BACKGROUND

Abrasive articles are used in industry for abrading, grinding, and polishing applications. They can be obtained in a variety of converted forms, such as belts, discs, sheets, and the like, in many different sizes.

Generally, when using abrasives articles in the form of "sheet goods" (i.e., discs and sheets), a back-up pad is used to mount or attach the abrasive article to the abrading tool. One type of back-up pad has dust collection holes connected by a series of grooves. The dust collection holes are typically connected to a vacuum source to help control swarf build-up on the abrading surface of the abrasive article. Removing the swarf, dust, and debris from the abrading surface is known to improve the performance of the abrasive article.

Some abrasive tools have integral vacuum systems with dust collection means. The extracting and holding capabilities of these abrasive tools have been limited, in part, due to the suction requirements current abrasive disks and their related back-up pads require.

In some abrasive tool configurations, swarf is collected in a complex dust collection system through a hose connected to the abrasive tools. Dust collection systems, however, are not always available for the abrasive tool operator. Further, the use of a dust collection system requires hoses that can be cumbersome and may interfere with the operator's manipulation of the abrasive tool.

There is a continuing need for alternative ways to provide an abrasive system with dust extraction capabilities. It would be particularly desirable to provide an abrasive article or an abrasive article mounting assembly with dust collection capabilities that can be used with or without a central vacuum system.

SUMMARY

The present invention relates generally to an abrasive filter assembly. More particularly, the present invention relates to an abrasive filter assembly with an integral dust collection system. The abrasive filter assembly can be in the form of an abrasive article or an abrasive article mounting assembly that can releasably engage an abrasive article.

In one aspect the present disclosure provides an abrasive filter assembly comprising a porous element having openings, a first filter media comprising a plurality of discrete channels formed by a plurality of channel sidewalls, the channels extending from the first surface of the first filter media to the second surface of the first filter media, a second filter media, an attachment interface layer, and at least one cavity located between the porous element and the attachment interface layer. The cavity comprises an open area of at least 1 square centimeter. The openings cooperate with the channels and the cavity to allow the flow of particles from the first surface of the porous element to the second filter media.

In some aspects, the porous element comprises an abrasive layer such that the abrasive filter assembly can function as an abrasive article. In other aspects, the porous element comprises an abrasive attachment interface. The abrasive attachment interface can be, for example, a loop portion of a two-part mechanical engagement system, a hook portion of a two-part mechanical engagement system, an adhesive attachment surface, and combinations thereof. In this aspect, the abrasive filter assembly can be used to releasably engage an abrasive article, such as, for example, an abrasive disk.

The layer comprising the cavity of the abrasive filter assembly of the present disclosure can consist of an independent layer, or the cavity can be integrated formed with the first filter media. Although not wishing to be bound by any particular theory, it is believed that the cavities facilitate lateral movement of swarf and debris and thus improve the overall performance of the abrasive filter assembly.

In another aspect, the present disclosure provides methods for making abrasive filter assemblies with integral dust collection capabilities.

The above summary of the abrasive filter assembly of the present disclosure is not intended to describe each disclosed embodiment of every implementation of the abrasive filter assembly of the present disclosure. The Figures and the detailed description that follow more particularly exemplify illustrative embodiments. The recitation of numerical ranges by endpoints includes all numbers subsumed with that range (e.g., 1 to 5 includes 1, 1.5, 2, 2.75, 3, 4, 4.80, and 5).

These figures, which are idealized, are intended to be merely illustrative of the abrasive filter assembly of the present disclosure and non-limiting.

DETAILED DESCRIPTION

Figure 1A:
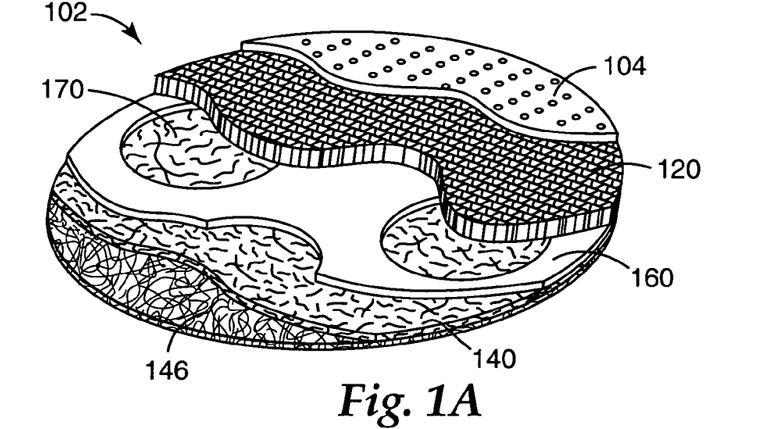
FIG. 1A is a perspective view of an exemplary abrasive filter assembly according to the present disclosure partially cut away to reveal the layers forming the assembly.

FIG. 1A shows a perspective view of an exemplary abrasive filter assembly 102 with a partial cut away. As shown in FIG. 1, the abrasive filter assembly 102 has a porous element 104, a first filter media 120, a cavity layer 160, a second filter media 140, and an attachment interface layer 146. The porous element 102 comprises a plurality of openings that allow the flow of particles through the porous element 104. The particles are then captured by the filter media within the abrasive filter assembly.

Figure 1B:
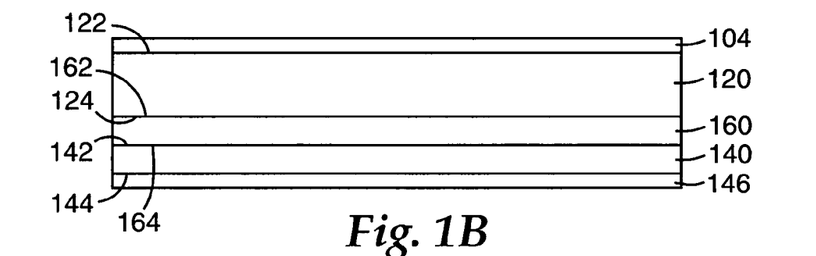
FIG. 1B is a cross-sectional view of the abrasive filter assembly shown in FIG. 1A.

FIG. 1B shows a cross-sectional view of the abrasive filter assembly shown in FIG. 1A. As shown in FIG. 1B, the abrasive filter assembly 102 comprises multiple layers. The first filter media comprises a first surface 122 and a second surface 124 opposite the first surface 122. The cavity layer 160 comprises a first surface 162, a second surface 164, and a plurality of openings 170. The second filter media 140 comprises a first surface 142 and a second surface 144 opposite the first surface 142. The first surface 122 of the first filter media 120 is proximate the porous element 104. The second surface 124 of the first filter media 120 is proximate the first surface 162 of the cavity layer 160. The first surface 142 of the second filter media 140 is proximate the second surface 164 of the cavity layer 160. An attachment interface layer 146 is proximate the second surface 144 of the second filter media 140.

The attachment interface layer of the abrasive filter assembly of the present disclosure can consist of a layer of adhesive, a sheet material, a molded body, or a combination thereof. The sheet material can comprise, for example, a loop portion or a hook portion of a two-part mechanical engagement system. In other embodiment, the attachment interface layer comprises a layer of pressure sensitive adhesive with an optional release liner to protect it during handling. In some preferred embodiments, the attachment interface layer is porous and allows air to pass through.

In some embodiments, the attachment interface layer of the abrasive filter assembly of the present disclosure comprises a nonwoven, woven or knitted loop material. The loop material can be used to affix the abrasive filter assembly to a back-up pad having a complementary mating component.

Suitable materials for a loop attachment interface layer include both woven and nonwoven materials. Woven and knit attachment interface layer materials can have loop-forming filaments or yarns included in their fabric structure to form upstanding loops for engaging hooks. Nonwoven loop attachment interface materials can have loops formed by the interlocking fibers. In some nonwoven loop attachment interface materials, the loops are formed by stitching a yarn through the nonwoven web to form upstanding loops.

Useful nonwovens suitable for use as a loop attachment interface layer include, but are not limited to, airlaids, spunbonds, spunlaces, bonded melt blown webs, and bonded carded webs. The nonwoven materials can be bonded in a variety of ways known to those skilled in the art, including, for example, needle-punched, stichbonded, hyrdoentangled, chemical bond, and thermal bond. The woven or nonwoven materials used can be made from natural (e.g., wood or cotton fibers), synthetic fibers (e.g., polyester or polypropylene fibers) or combinations of natural and synthetic fibers. In some embodiments, the attachment interface layer is made from nylon, polyester or polypropylene.

In some embodiments, a loop attachment interface layer having an open structure that does not significantly interfere with the flow of air through it is selected. In some embodiments, the attachment interface layer material is selected, at least in part, based on the porosity of the material.

In some embodiments, the attachment interface layer of the abrasive filter assembly of the present disclosure comprises a hook material. The material used to form the hook material useful in the present disclosure may be made in one of many different ways known to those skilled in the art. Several suitable processes for making hook material useful in making attachment interface layers useful for the present disclosure, include, for example, methods described in U.S. Pat. No. 5,058,247 (Thomas et al.) (for low cost hook fasteners); U.S. Pat. No. 4,894,060 (Nestegard) (for diaper fasteners), U.S. Pat. No. 5,679,302 (Miller et al.) (entitled "Method for making a mushroom-type hook strip for a mechanical fastener"), and U.S. Pat. No. 6,579,161 (Chesley et al.), each of which is incorporated herein by reference.

The hook material may be a porous material, such as, for example the polymer netting material reported in U.S. Publication 2004/0170801 (Seth et al.), which is incorporated herein by reference. In other embodiments, the hook material may be apertured to allow air to pass through. Apertures can be formed in the hook material using any methods known to those skilled in the art. For example, the apertures can be cut from a sheet of hook material using, for example, a die, laser, or other perforating instruments known to those skilled in the art. In other embodiments, the hook material can be formed with apertures.

Figure 2:
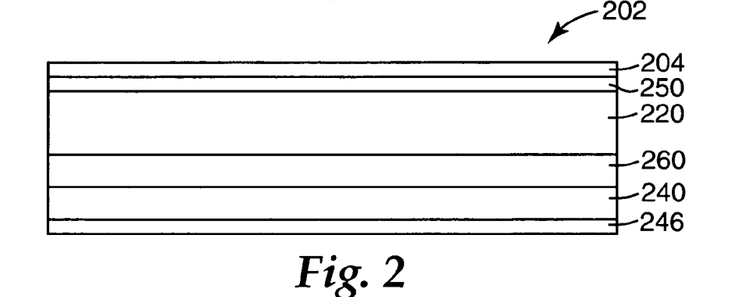
FIG. 2 is a cross-sectional view of an exemplary abrasive filter assembly according to the present disclosure having a third filter media layer.

FIG. 2 shows a cross-sectional view of an exemplary abrasive filter assembly according to the present disclosure having an optional third filter media layer. The abrasive filter assembly 202 has a porous element 204, a first filter media 220, a second filter media 240, a third filter media 250, and an attachment interface layer 246. As shown in FIG. 2, the third filter media 250 can be located between the porous element 204 and the first filter media 220. In other embodiments, a third filter media can be located proximate the second filter media, either between the second filter media and the attachment interface layer or between the second filter media and the first filter media.

The third filter media can include a wide variety of types of porous filter media as discussed in reference to the second filter media, below. The third filter media can be a fibrous material, a foam, a porous membrane, and the like.

The various layers in the abrasive filter assembly of the abrasive filter assembly of the present disclosure can be held together using any suitable form of attachment, such as, for example, glue, pressure sensitive adhesive, hot-melt adhesive, spray adhesive, thermal bonding, and ultrasonic bonding. In some embodiments, the layers are adhered to one another by applying a spray adhesive, such as, for example, "3M BRAND SUPER 77 ADHESIVE", available from 3M Company, St. Paul, Minn., to one side of the porous abrasive. In other embodiments, a hot-melt adhesive is applied to one side of a layer using either a hot-melt spray gun or an extruder with a comb-type shim. In yet further embodiments, a preformed adhesive mesh is placed between the layers to be joined.

The porous element and various filter media layers of the abrasive filter assembly of the present disclosure are affixed to one another in a manner that does not prevent the flow of particles from one layer to the next. In some embodiments, the porous element and various filter media layers of the abrasive filter assembly of the present disclosure are affixed to one another in a manner that does not substantially inhibit the flow of particles from one layer to the next. The level of particle flow through the abrasive filter assembly can be restricted, at least in part, by the introduction of an adhesive between the porous element and the first filter media, or the first filter media and the second filter media. The level of restriction can be minimized by applying the adhesive between layers in a discontinuous fashion such as, for example, as discrete adhesive areas (e.g., atomized spray or starved extrusion die) or distinct adhesive lines (e.g., hot melt swirl-spray or patterned roll coater).

The attachment interface layer of the abrasive filter assembly of the present disclosure is affixed to the filter media in a manner that does not prevent the flow of air from the filter media. In some embodiments, the attachment interface layer of the abrasive filter assembly of the present disclosure is affixed to the filter media in a manner that does not substantially inhibit the flow of air from the filter media. The level of air flow through the attachment interface layer can be restricted, at least in part, by the introduction of an adhesive between an attachment interface layer comprising a sheet material and the filter media. The level of restriction can be minimized by applying the adhesive between the sheet material of the attachment interface layer and the filter media in a discontinuous fashion such as, for example, as discrete adhesive areas (e.g., atomized spray or starved extrusion die) or distinct adhesive lines (e.g., hot melt swirl-spray or patterned roll coater).

Adhesives useful in the present disclosure include both pressure sensitive and non-pressure sensitive adhesives. Pressure sensitive adhesives are normally tacky at room temperature and can be adhered to a surface by application of, at most, light finger pressure, while non-pressure sensitive adhesives include solvent, heat, or radiation activated adhesive systems. Examples of adhesives useful in the present disclosure include those based on general compositions of polyacrylate; polyvinyl ether; diene-containing rubbers such as natural rubber, polyisoprene, and polyisobutylene; polychloroprene; butyl rubber; butadiene-acrylonitrile polymers; thermoplastic elastomers; block copolymers such as styrene-isoprene and styrene-isoprene-styrene block copolymers, ethylene-propylene-diene polymers, and styrene-butadiene polymers; polyalphaolefins; amorphous polyolefins; silicone; ethylene-containing copolymers such as ethylene vinyl acetate, ethylacrylate, and ethylmethacrylate; polyurethanes; polyamides; polyesters; epoxies; polyvinylpyrrolidone and vinylpyrrolidone copolymers; and mixtures of the above. Additionally, the adhesives can contain additives such as tackifiers, plasticizers, fillers, antioxidants, stabilizers, pigments, diffusing particles, curatives, and solvents.

Figure 3A:
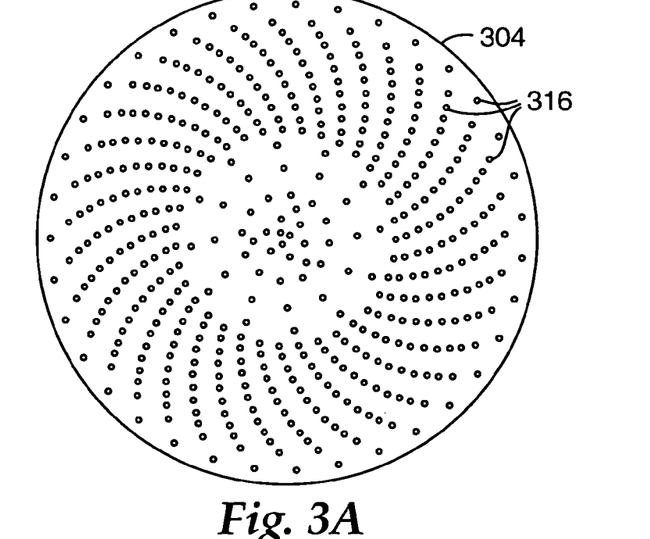
FIG. 3A is a view of an exemplary porous element according to the present disclosure.
Figure 3B:
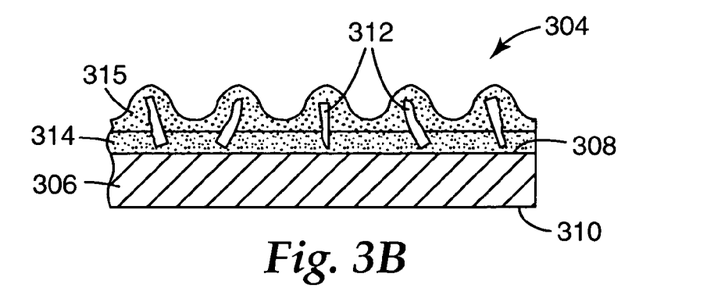
FIG. 3B is a cross-sectional view of the porous element shown in FIG. 3A.

FIG. 3A shows a view of an exemplary coated abrasive material that can be used to form the porous element according to the present disclosure. FIG. 3B shows a cross-sectional view of a section of the porous element shown in FIG. 3A. As shown in FIG. 3A, the porous element 304 comprises a substrate 306 having a first surface 308 and a second surface 310, a make coat 314, a plurality of abrasive particles 312, and a size coat 315. The make and size coat can be individually or collectively referred to as "binder". As shown in FIG. 3A, the porous element 304 comprises a plurality of apertures 316 (not shown in FIG. 3B).

Figure 4:
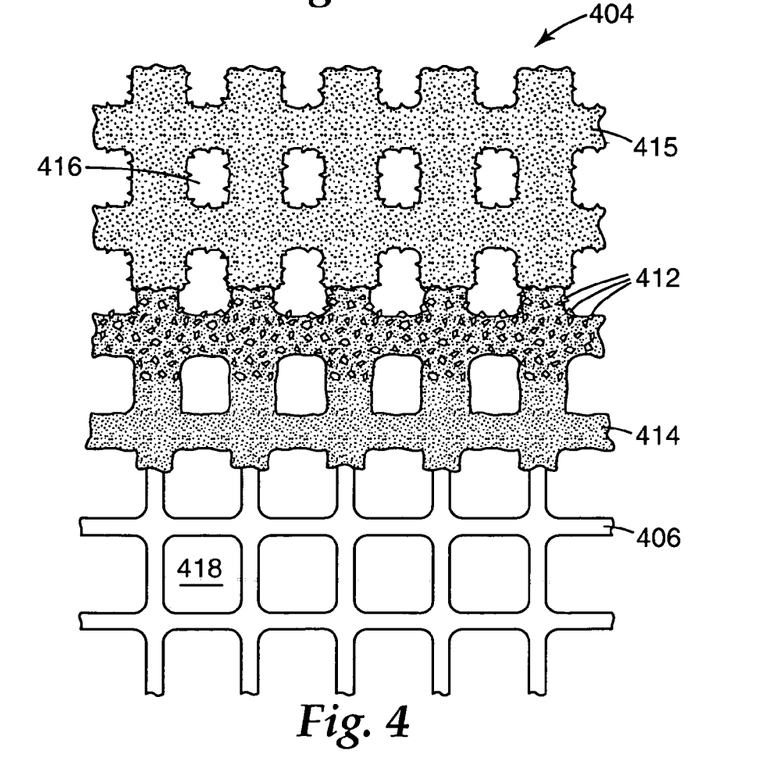
FIG. 4 is a top view of an exemplary porous element according to the present disclosure partially cut away to reveal the components forming the abrasive layer.

FIG. 4 shows a top view of an exemplary screen abrasive material that can be used to form the porous element according to the present disclosure. FIG. 4 includes a partial cut away to reveal the components forming the abrasive layer. As shown in FIG. 4, the porous element 404 comprises an open mesh substrate 406, a make coat 414, a plurality of abrasive particles 412, and a size coat 415. The porous element 404 comprises a plurality of openings 416 that extend through the porous element. The openings 416 are formed by openings 418 in the open mesh substrate 406.

The open mesh substrate can be made from any porous material, including, for example, perforated films, nonwovens, or woven or knitted fabrics. In the embodiment shown in FIG. 4, the open mesh substrate 406 is a perforated film. The film for the backing can be made from metal, paper, or plastic, including molded thermoplastic materials and molded thermoset materials. In some embodiments, the open mesh substrate is made from perforated or slit and stretched sheet materials. In some embodiments, the open mesh substrate is made from fiberglass, nylon, polyester, polypropylene, or aluminum.

The openings 418 in the open mesh substrate 406 can be generally square shaped as shown in FIG. 4. In other embodiments, the shape of the openings can be other geometric shapes, including, for example, a rectangle shape, a circle shape, an oval shape, a triangle shape, a parallelogram shape, a polygon shape, or a combination of these shapes. The openings 418 in the open mesh substrate 406 can be uniformly sized and positioned as shown in FIG. 4. In other embodiments, the openings may be placed non-uniformly by, for example, using a random opening placement pattern, varying the size or shape of the openings, or any combination of random placement, random shapes, and random sizes.

In another aspect, a screen abrasive with a woven or knitted substrate can be used to form the porous element in the present disclosure. A woven substrate typically comprises a plurality of generally parallel warp elements that extend in a first direction and a plurality of generally parallel weft elements that extend in a second direction. The weft elements and warp elements of the open mesh substrate intersect to form a plurality of openings. The second direction can be perpendicular to the first direction to form square shaped openings in the woven open mesh substrate. In some embodiments, the first and second directions intersect to form a diamond pattern. The shape of the openings can be other geometric shapes, including, for example, a rectangle shape, a circle shape, an oval shape, a triangle shape, a parallelogram shape, a polygon shape, or a combination of these shapes. In some embodiments, the warp and weft elements are yarns that are woven together in a one-over-one weave.

The warp and weft elements may be combined in any manner known to those in the art, including, for example, weaving, stitch-bonding, or adhesive bonding. The warp and weft elements may be fibers, filaments, threads, yarns or a combination thereof. The warp and weft elements may be made from a variety of materials known to those skilled in the art, including, for example, synthetic fibers, natural fibers, glass fibers, and metal. In some embodiments, the warp and weft elements comprise monofilaments of thermoplastic material or metal wire. In some embodiments, the woven open mesh substrate comprises nylon, polyester, or polypropylene.

In some embodiments, the porous element comprises an adhesive attachment surface. The adhesive attachment surface is configured so that an abrasive article with a pressure sensitive adhesive backing can be affixed to the adhesive attachment surface. The adhesive attachment surface is typically planar and can comprise any adhesive attachment surface for abrasive articles known to those skilled in the art, including, for example, plastic and foam sheet materials.

The porous element, whether a screen abrasive, a nonwoven abrasive, a perforated coated abrasive, an adhesive attachment surface, or otherwise, may comprise openings having different open areas. The "open area" of an opening in the porous element refers to the area of the opening as measured over the thickness of the porous element (i.e., the area bounded by the perimeter of material forming the opening through which a three-dimensional object could pass). Porous elements useful in the present disclosure typically have an average open area of at least about 0.5 square millimeters per opening. In some embodiments, the porous element has an average open area of at least about 1 square millimeters per opening. In yet further embodiments, the porous element has an average open area of at least about 1.5 square millimeters per opening.

Typically, porous elements useful in the present disclosure have an average open area that is less than about 4 square millimeters per opening. In some embodiments, the porous element has an average open area that is less than about 3 square millimeters per opening. In yet further embodiments, the porous element has an average open area that is less than about 2.5 square millimeters per opening.

The porous element, whether woven, perforated or otherwise, comprises a total open area that affects the amount of air that can pass through the porous element as well as the effective area and performance of the abrasive layer. The "total open area" of the porous element refers to the cumulative open areas of the openings as measured over the area formed by the perimeter of the porous element. Porous elements useful in the present disclosure have a total open area of at least about 0.01 square centimeters per square centimeter of the abrasive layer (i.e., 1 percent open area). In some embodiments, the porous element has a total open area of at least about 0.03 square centimeters per square centimeter of the abrasive layer (i.e., 3 percent open area). In yet further embodiments, the porous element has a total open area of at least about 0.05 square centimeters per square centimeter of the abrasive layer (i.e., 5 percent open area).

Typically, porous elements useful in the present disclosure have a total open area that is less than about 0.95 square centimeters per square centimeter of the abrasive layer (i.e., 95 percent open area). In some embodiments, the porous element has a total open area that is less than about 0.9 square centimeters per square centimeter of the abrasive layer (i.e., 90 percent open area). In yet further embodiments, the porous element has a total open area that is less than about 0.80 square centimeters per square centimeter of the abrasive layer (i.e., 80 percent open area).

As discussed above, the porous element can comprise an abrasive article, including, for example, a perforated coated abrasive, a coated screen abrasive, a nonwoven abrasive, or otherwise. The abrasive articles comprise a plurality of abrasive particles and at least one binder. In some embodiments, the abrasive article comprises a make coat, a size coat, a supersize coat, or a combination thereof. In some embodiments, a treatment can be applied to the substrate such as, for example, a presize, a backsize, a subsize, or a saturant.

Typically, the make layer of a coated abrasive is prepared by coating at least a portion of the substrate (treated or untreated) with a make layer precursor. Abrasive particles are then at least partially embedded (e.g., by electrostatic coating) to the make layer precursor comprising a first binder precursor, and the make layer precursor is at least partially cured. Electrostatic coating of the abrasive particles typically provides erectly oriented abrasive particles. In the context of the abrasive filter assembly of the present disclosure, the term "erectly oriented" refers to a characteristic in which the longer dimensions of a majority of the abrasive particles are oriented substantially perpendicular (i.e., between 60 and 120 degrees) to the backing. Other techniques for erectly orienting abrasive particles can also be used.

Next, the size layer is prepared by coating at least a portion of the make layer and abrasive particles with a size layer precursor comprising a second binder precursor (which may be the same as, or different from, the first binder precursor), and at least partially curing the size layer precursor. In some coated abrasive articles, a supersize is applied to at least a portion of the size layer. If present, the supersize layer typically includes grinding aids and/or anti-loading materials.

Typically, a binder is formed by curing (e.g., by thermal means, or by using electromagnetic or particulate radiation) a binder precursor. Useful first and second binder precursors are known in the abrasive art and include, for example, free-radically polymerizable monomer and/or oligomer, epoxy resins, acrylic resins, urethane resins, phenolic resins, urea-formaldehyde resins, melamine-formaldehyde resins, aminoplast resins, cyanate resins, or combinations thereof. Useful binder precursors include thermally curable resins and radiation curable resins, which may be cured, for example, thermally and/or by exposure to radiation.

Suitable abrasive particles for the abrasive articles useful in the present disclosure can be any known abrasive particles or materials commonly used in abrasive articles. Examples of useful abrasive particles for coated abrasives include, for example, fused aluminum oxide, heat treated aluminum oxide, white fused aluminum oxide, black silicon carbide, green silicon carbide, titanium diboride, boron carbide, tungsten carbide, titanium carbide, diamond, cubic boron nitride, garnet, fused alumina zirconia, sol gel abrasive particles, silica, iron oxide, chromia, ceria, zirconia, titania, silicates, metal carbonates (such as calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, aluminum trihydrate, graphite, metal oxides (e.g., tin oxide, calcium oxide), aluminum oxide, titanium dioxide) and metal sulfites (e.g., calcium sulfite), metal particles (e.g., tin, lead, copper), plastic abrasive particles formed from a thermoplastic material (e.g., polycarbonate, polyetherimide, polyester, polyethylene, polysulfone, polystyrene, acrylonitrile-butadiene-styrene block copolymer, polypropylene, acetal polymers, polyvinyl chloride, polyurethanes, nylon), plastic abrasive particles formed from crosslinked polymers (e.g., phenolic resins, aminoplast resins, urethane resins, epoxy resins, melamine-formaldehyde, acrylate resins, acrylated isocyanurate resins, urea-formaldehyde resins, isocyanurate resins, acrylated urethane resins, acrylated epoxy resins), and combinations thereof. The abrasive particles may also be agglomerates or composites that include additional components, such as, for example, a binder. Criteria used in selecting abrasive particles used for a particular abrading application typically include: abrading life, rate of cut, substrate surface finish, grinding efficiency, and product cost.

Abrasive articles useful in the article of the abrasive filter assembly of the present disclosure can further comprise optional additives, such as, for example, abrasive particle surface modification additives, coupling agents, plasticizers, fillers, expanding agents, fibers, antistatic agents, initiators, suspending agents, photosensitizers, lubricants, wetting agents, surfactants, pigments, dyes, UV stabilizers, and suspending agents. The amounts of these materials are selected to provide the properties desired. Additives may also be incorporated into the binder, applied as a separate coating, held within the pores of the agglomerate, or combinations of the above.

Figure 5A:
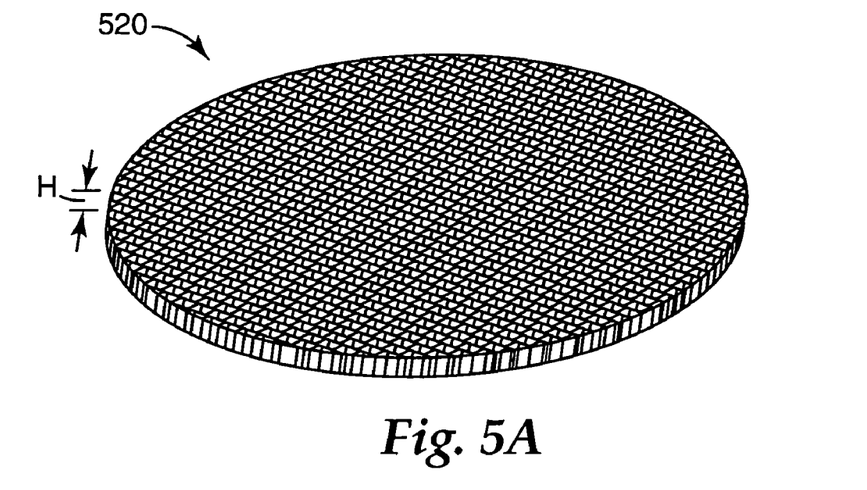
FIG. 5A is a perspective view of an exemplary first filter media layer comprising stacked film layers according to the present disclosure.
Figure 5B:
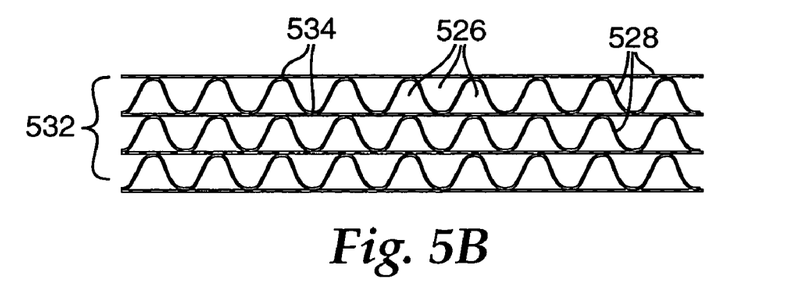
FIG. 5B is a top view of a portion of the exemplary first filter media layer shown in FIG. 5A.

FIG. 5A shows a perspective view of an exemplary first filter media layer useful in the present disclosure comprising stacked film layers. FIG. 5B shows a top view of a portion of the exemplary first filter media layer shown in FIG. 5A. As shown in FIG. 5A, the first media layer has a thickness or height H. The height of the first filter media can be varied to accommodate varying applications. For example, if the particular abrading application demands an abrasive filter assembly with large particulate holding capacity, the height of the first filter media can be increased. The height of the first filter media can be defined by other parameters, including, for example, the desired rigidity of the abrasive filter assembly. In some embodiments, the first filter media of the abrasive filter assembly of the present disclosure is relatively rigid in comparison to the other filter media used in the abrasive filter assembly.

First filter media useful in the present disclosure typically have an average height of at least about 0.5 millimeter. In some embodiments, the first filter media has an average height of at least about 1 millimeter. In yet further embodiments, the first filter media has an average height of at least about 3 millimeters.

Typically, first filter media useful in the present disclosure have an average height that is less than about 30 millimeters. In some embodiments, the first filter media has an average height that is less than about 20 millimeters. In yet further embodiments, the first filter media has an average height that is less than about 10 millimeters.

As shown in FIG. 5B, an exemplary first filter media useful in the present disclosure comprises a stack 532 of polymer films that form the sidewalls 528 of channels 526 that extend through the height of the first filter media 520. The sidewalls 528 are held together at bond areas 534. First filter media that can be included in the abrasive filter assembly of the abrasive filter assembly of the present disclosure include, for example, the filter media described in U.S. Pat. No. 6,280,824 (Insley et al.), U.S. Pat. No. 6,454,839 (Hagglund et al.), and U.S. Pat. No. 6,589,317 (Zhang et al.), each of which is incorporated herein by reference.

Polymers useful in forming the polymer film sidewalls of a first filter media that can be used in the present disclosure include, but are not limited to, polyolefins such as polyethylene and polyethylene copolymers, polypropylene and polypropylene copolymers, polyvinylidene difluoride (PVDF), and polytetrafluoroethylene (PTFE). Other polymeric materials include acetates, cellulose ethers, polyvinyl alcohols, polysaccharides, polyesters, polyamides, poly(vinyl chloride), polyurethanes, polyureas, polycarbonates, and polystyrene. The polymer film layers can be cast from curable resin materials such as acrylates or epoxies and cured through free radical pathways promoted chemically, by exposure to heat, UV, or electron beam radiation. In some preferred embodiments, the polymer film layers are formed of polymeric material capable of being charged namely dielectric polymers and blends such as polyolefins or polystyrenes.

The polymer film layers may have structured surfaces defined on one or both faces as reported, for example, in U.S. Pat. No. 6,280,824 (Insley et al.), incorporated herein by reference. The structured surfaces can be in the shape of upstanding stems or projections, e.g., pyramids, cube corners, J-hooks, mushroom heads, or the like; continuous or intermittent ridges; e.g., rectangular or v-shaped ridges with intervening channels; or combinations thereof. These projections can be regular, random or intermittent or be combined with other structures such as ridges. The ridge type structures can be regular, random intermittent, extend parallel to one another, or be at intersecting or nonintersecting angles and be combined with other structures between the ridges, such as nested ridges or projections. Generally, the high aspect ratio structures can extend over all or just a region of a film. When present in a film region, the structures provide a surface area greater than a corresponding planar film.

The structured surfaces can be made by any known method of forming a structured film, such as the methods disclosed in U.S. Pat. Nos. 5,069,403 and 5,133,516, both to Marantic et al.; U.S. Pat. No. 5,691,846 to Benson et al.; U.S. Pat. No. 5,514,120 to Johnston et al.; U.S. Pat. No. 5,175,030 to Lu et al.; U.S. Pat. No. 4,668,558 to Barber; U.S. Pat. No. 4,775,310 to Fisher; U.S. Pat. No. 3,594,863 to Erb or U.S. Pat. No. 5,077,870 to Melbye et al. These methods are all incorporated by reference in their entirety.

Figure 6:
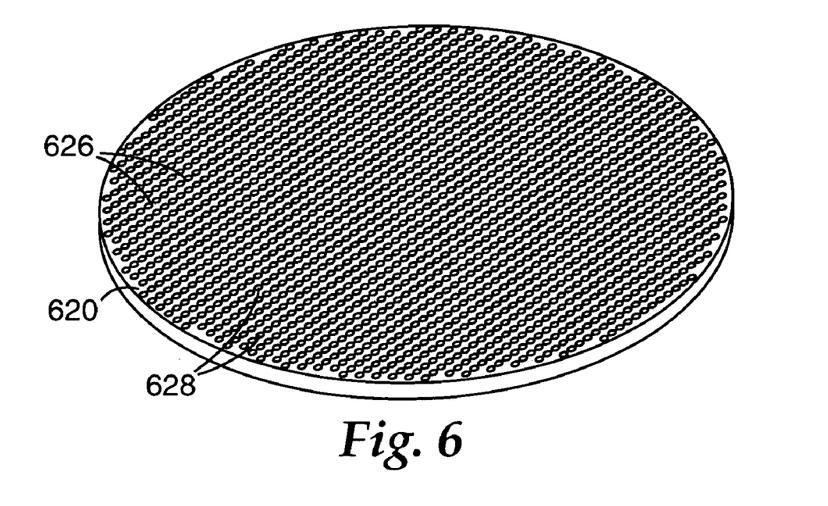
FIG. 6 is a perspective view of an exemplary first filter media layer comprising a perforated body according to the present disclosure.

FIG. 6 shows a perspective view of another exemplary first filter media layer useful in the present disclosure comprising a perforated body. As shown in FIG. 6, the first filter media 620 comprises a plurality of channels 626 with channel sidewalls 628 extending from the first surface to the second surface of the first filter media. The filter media shown in FIG. 6 can be constructed from a variety of materials, including, for example, foam, paper, or plastic, including molded thermoplastic materials and molded thermoset materials. In some embodiments, the first filter media is made from perforated porous foam material. In yet further embodiments, the first filter media is made from perforated or slit and stretched sheet materials. In some embodiments utilizing a perforated body as a first filter media, the perforated body is made from fiberglass, nylon, polyester, or polypropylene.

In some embodiments, the first filter media has discrete channels that extend from the first surface to the second surface of the first filter media. The channels can have a non-tortuous path that extends directly from the first surface to the second surface of the first filter media. The cross-sectional area of the channels can be described in terms of an effective circular diameter which is the diameter of the largest circle that will pass through an individual channel.

First filter media useful in the present disclosure typically have channels with an average effective circular diameter of at least about 0.1 millimeter. In some embodiments, the first filter media has channels with an average effective circular diameter of at least about 0.3 millimeter. In yet further embodiments, the first filter media has channels with an average effective circular diameter of at least about 0.5 millimeters.

Typically, first filter media useful in the present disclosure have channels with an average effective circular diameter that is less than about 2 millimeters. In some embodiments, the first filter media has channels with an average effective circular diameter that is less than about 1 millimeter. In yet further embodiments, the first filter media has channels with an average effective circular diameter that is less than about 0.5 millimeters.

The filter media, including the first, second, or optional third filter media, of the abrasive filter assembly of the present disclosure can be electrostatically charged. Electrostatic charging enhances the filter media's ability to remove particulate matter from a fluid stream by increasing the attraction between particles and the surface of the filter media. Non-impinging particles passing close to sidewalls are more readily pulled from the fluid stream, and impinging particles are adhered more strongly. Passive electrostatic charging is provided by an electret, which is a dielectric material that exhibits an electrical charge that persists for extended time periods. Electret chargeable polymeric materials include nonpolar polymers such as polytetrafluoroethylene (PTFE) and polypropylene.

Several methods are used to charge dielectric materials, any of which may be used to charge the filtration media of the abrasive filter assembly of the present disclosure, including corona discharge, heating and cooling the material in the presence of a charged field, contact electrification, spraying the web with charged particles, and impinging a surface with water jets or water droplet streams. In addition, the chargeability of the surface may be enhanced by the use of blended materials. Examples of charging methods are disclosed in the following patents: U.S. Pat. No. RE30,782 (van Turnhout et al.), U.S. Pat. No. RE31,285 (van Turnhout et al.), U.S. Pat. No. 5,496,507 (Angadjivand et al.), U.S. Pat. No. 5,472,481 (Jones et al.), U.S. Pat. No. 4,215,682 (Kubik et al.), U.S. Pat. No. 5,057,710 (Nishiura et al.) and U.S. Pat. No. 4,592,815 (Nakao).

The cavity layer of the abrasive filter assembly of the present disclosure can consist of an independent layer as shown in FIG. 1A, or the cavity layer can be integrated formed with the first filter media. In some embodiments, the cavity layer is integrally formed with the first filter media so that the cavities extend through a portion of the first filter media. The cavities typically extend through less than 75 percent of the thickness of the first filter media. In some embodiment, the cavities extend through less than 50 percent of the thickness of the first filter media.

In embodiments that use an independent cavity layer, the cavity layer can be made from a variety of materials, including, for example, foam, paper, metal, or plastic, including molded thermoplastic materials and molded thermoset materials. In some embodiments, the cavity layer is made from perforated porous foam material. In yet further embodiments, the cavity layer is made from a perforated body made from fiberglass, nylon, polyester, or polypropylene.

Figures 7, 8, 9, 10A, 10B:
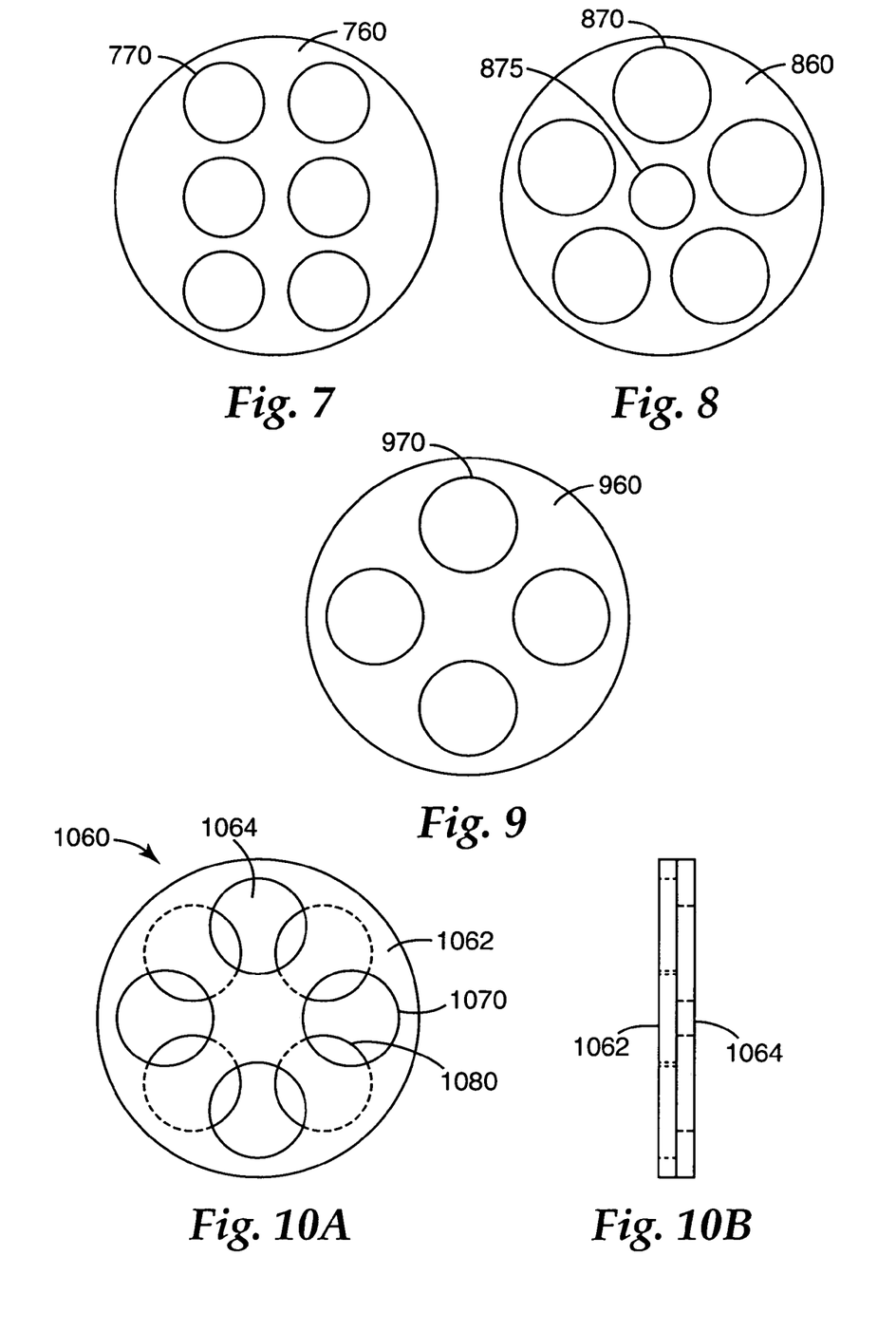
FIG. 7 is a top view of an exemplary cavity layer with six openings in a rectangular array.
FIG. 8 is a top view of another exemplary cavity layer with a circular array of openings.
FIG. 9 is a top view of another exemplary cavity layer with four circular openings.
FIG. 10A is a top view of two cavity layers as shown in FIG. 9 stacked with a 45 degree offset.
FIG. 10B is a side view of the stacked cavity layers shown in FIG. 10A.

FIGS. 7-12 show top views of a variety of cavity opening geometries. In FIG. 7, for example, the cavity layer 760 comprises 6 circular cavities 770. Although not wishing to be bound by any particular theory, it is believed that the cavities facilitate lateral movement of swarf and debris and thus improve the overall performance of the abrasive filter assembly.

Figure 11A:
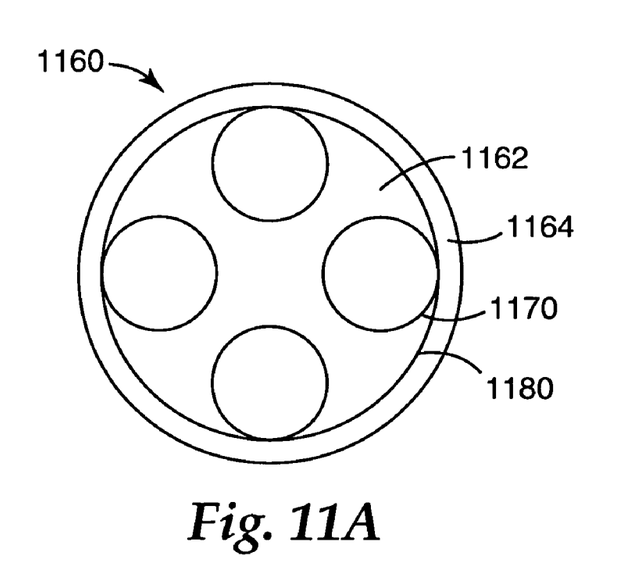
FIG. 11A is a top view of exemplary stacked cavity layers having one cavity layer with a large circular opening and a second cavity layer with four smaller circular openings.
Figure 11B:
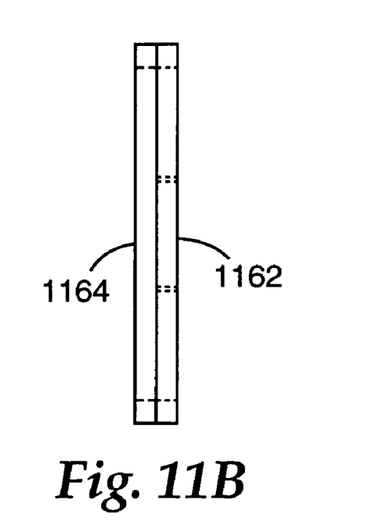
FIG. 11B is a side view of the stacked cavity layers shown in FIG. 11A.
Figure 12:
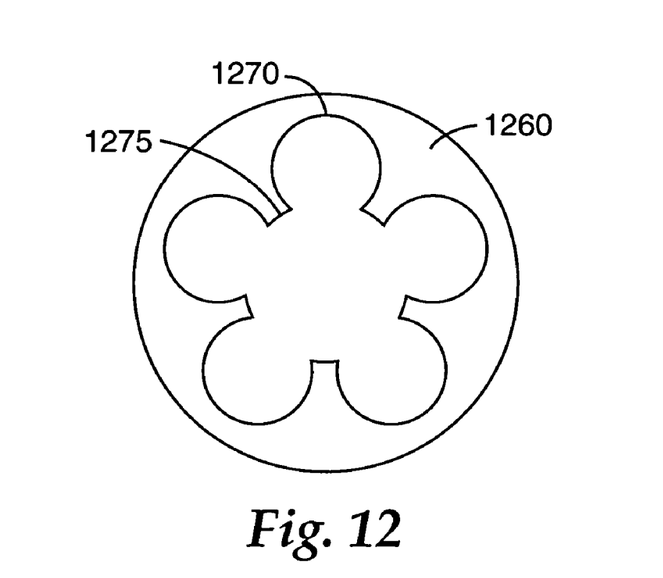
FIG. 12 is a top view of another exemplary cavity layer comprising a single opening having five lobes.

FIG. 7 is a top view of an exemplary cavity layer 760 with six cavities 770 in a rectangular array. FIG. 8 is a top view of another exemplary cavity layer 860 with a circular array of cavities of a first dimension 870 and a center cavity of a second dimension 875. FIG. 9 is a top view of another exemplary cavity layer 960 with four circular cavities 970. FIG. 10A is a top view of a cavity layer assembly 1060 comprising two cavity layers 1062, 1064 as shown in FIG. 9 stacked with about a 45 degree offset. Cavity layer 1062 comprises cavities 1070 and cavity layer 1064 comprises cavities 1080. FIG. 10B is a side view of the stacked cavity layers shown in FIG. 10A. FIG. 11A is a top view of an exemplary cavity layer assembly 1160 comprising stacked cavity layers 1162, 1164 having one cavity layer 1164 with a large circular cavity 1180 and a second cavity layer 1162 with four smaller circular cavities 1170. FIG. 11B is a side view of the stacked cavity layers shown in FIG. 11A. FIG. 12 is a top view of another exemplary cavity layer 1260 comprising a single cavity 1275 having five lobes 1270.

The cavity openings can be generally circular shaped. The shape of the openings can be other geometric shapes as well, including, for example, a rectangle shape, a circle shape, an oval shape, a triangle shape, a parallelogram shape, a polygon shape, or a combination of these shapes. The cavities can be uniformly sized and positioned. In other embodiments, the openings may be placed non-uniformly by, for example, using a random opening placement pattern, varying the size or shape of the openings, or any combination of random placement, random shapes, and random sizes.

The cavity layer, whether an independent layer within the abrasive filter assembly or integrally formed in the first filter media, may comprise cavities having different open areas. The "open area" of a cavity in the cavity layer refers to the area of the cavity as measured over the thickness of the cavity layer (i.e., the area bounded by the perimeter of material forming the cavity through which a three-dimensional object could pass). Cavities useful in the present disclosure typically have an average open area of at least about 1 square centimeter per cavity. In some embodiments, the cavities have an average open area of at least about 10 square centimeters per opening.

In some embodiments, cavities can be at least partially filled with a filter media, such as, for example, any materials identified as useful for the second filter media discussed below. In some embodiments, the second filter media is located within the cavities. In yet further embodiments, the cavities comprise a filter material in addition to a second filter media located elsewhere in the abrasive filter assembly.

The second filter media can include a wide variety of types of porous filter media conventionally used in filtration products, particularly air filtration products. The filter media can be a fibrous material, a foam, a porous membrane, and the like. In some embodiments, the second filter media comprises a fibrous material. The second filter media can be a fibrous filter web such as a nonwoven fibrous web, although woven and knitted webs can also be used.

In some embodiments, the second filter media comprises fibrous materials having a fiber size that is less than about 100 microns in diameter, and sometimes less than about 50 microns, and sometimes less than about 1 micron in diameter. A wide variety of basis weights can be used in the second filter media. The basis weight of the second filter media is typically in the range of about 5 grams per square meter to about 1000 grams per square meter. In some embodiments, the second filter media is in the range of about 10 grams per square meter to about 200 grams per square meter. If desired, the second filter media can include one or more layers (webs) of filter media.

The second filter media can be made from a wide variety of organic polymeric materials, including mixtures and blends. Suitable filter media includes a wide range of materials commercially available. They include polyolefins, such as polypropylene, linear low density polyethylene, poly-1-butene, poly(4-methyl-1-pentene), polytetrafluoroethylene, polytrifluorochloroethylene; or polyvinylchloride; aromatic polyarenes, such as polystyrene; polycarbonates; polyesters; and combinations thereof (including blends or copolymers). In some embodiments, materials include polyolefins free of branched alkyl radicals and copolymers thereof. In yet further embodiments, materials include thermoplastic fiber formers (e.g., polyolefins such as polyethylene, polypropylene, copolymers thereof, etc.). Other suitable materials include: thermoplastic polymers such as polylactic acid (PLA); non-thermoplastic fibers such as cellulose, rayon, acrylic, and modified acrylic (halogen modified acrylic); polyamide or polyimide fibers such as those available under the tradenames NOMEX and KEVLAR from DuPont; and fiber blends of different polymers.

In embodiments employing a nonwoven as the second filter media, the nonwoven filter media can be formed in a web by conventional nonwoven techniques including melt blowing, spunbonding, carding, air laying (dry laying), wet laying, or the like. If desired, the fibers or webs can be charged by known methods, including, for example, by use of corona discharge electrodes or high-intensity electric fields. The fibers can be charged during fiber formation, prior to or while forming the fibers into the filter web or subsequent to forming the filter web. The fibers forming the second media filter can even be charged subsequent to being joined to the first filter media. The second filter media can comprises fibers coated with a polymer binder or adhesive, including pressure sensitive adhesives.

The abrasive filter assemblies of the abrasive filter assembly of the present disclosure have been found to be efficient in collecting large amounts of particles at high rates of delivery. The multiple filter components used in the present disclosure have been found to overcome deficiencies with current abrasive articles. Although not wishing to be bound by any particular theory, it is believed that in the case of the abrasive filter assembly of the present disclosure, the multiple filter components can function such that a given component (e.g., the first filter media) can be aided by a secondary component (e.g., the second filter media or a cavity layer) that can address the failure mode of the first component and compensate, keeping overall efficiency high and extending performance to a level that aligns with the performance of the abrasive it is used with.

Advantages and other embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

The following abbreviations are used throughout the Examples:

Abrasive Media

A1: A coated abrasive material, commercially available under the trade designation "IMPERIAL HOOKIT DISC 360L GRADE P320" from 3M Company, St. Paul, Minn.;

A2: Coated abrasive material "A1", having laser perforated 1.77 millimeter (mm) diameter holes at a frequency of 1.8 holes per square centimeter without the adhesive or loop backing;

A3: An abrasive scrim material, commercially available under the trade designation "ABRANET GRADE P320" from KWH Mirka Ltd., Jeppo, Finland; and A4: Coated abrasive material "A1", having laser perforated 1.77 millimeter diameter holes at a frequency of 1.8 holes per square centimeter.

Cavity Structure and Filler Media:

C1: A polyurethane blown micro fiber web, 70 grams per square meter basis weight;

C2: 5 mm thick polyurethane foam, 6 pounds per cubic foot (0.096 grams per cubic centimeter) density, with a 1.5 inch (38 mm) diameter center hole, commercially available under the trade designation "R600U" from Illbruck, Inc., Minneapolis, Minn.;

C3: 5 mm thick section of bare polyurethane foam, 6 pounds per cubic foot (0.096 grams per cubic centimeter) density, with a 0.75 inch (19 mm) diameter center hole, commercially available under the trade designation "R600U" from Illbruck, Inc.;

C4: 4.5 mm thick polyurethane foam, 0.028 grams per cubic centimeter density, commercially available under the trade designation "P50" from Illbruck, Inc.;

C5: 1 mm thick nylon 6,6 film, commercially available from Industrial Plastic Supply Inc., Anaheim, Calif., as shown in approximate form in FIG. 12;

C6: 2 mm thick nylon 6,6 film, commercially available from Industrial Plastic Supply Inc., as shown in approximate form in FIGS. 11A and 11B;

C7: 1 mm thick nylon 6,6 film, commercially available from Industrial Plastic Supply Inc., as shown in approximate form in FIG. 8;

C8: 1 mm thick nylon 6,6 film, commercially available from Industrial Plastic Supply Inc., as shown in approximate form in FIG. 7;

C9: 2 mm thick nylon 6,6 film, commercially available from Industrial Plastic Supply Inc., as shown in approximate form in FIGS. 10A and 10B;

C10: 1 mm thick nylon 6,6 film, commercially available from Industrial Plastic Supply Inc., as shown in approximate form in FIG. 9;

C11: 3 layers of polyester mesh, basis weight 12.27 grams per square meter basis per layer, 6 cells per cubic meter mesh, 0.35 millimeter thick, cut into a 10 centimeter diameter discs, commercially available under the trade designation "BISCAPOL" from Biscor Ltd., Bradford, England.

Filter Media

F1: 5 millimeter thick corrugated polypropylene multilayer filter media, commercially available under the trade designation "3M HIGH AIRFLOW AIR FILTRATION MEDIA (HAF); 5 MM" from 3M Company;

F2: 10 millimeter thick corrugated polypropylene multilayer filter media, commercially available under the trade designation "3M HIGH AIRFLOW AIR FILTRATION MEDIA (HAF); 10 MM" from 3M Company;

F3: 5 millimeter thick polyurethane foam, 6 pounds per cubic foot (0.096 grams per cubic centimeter) density, commercially available under the trade designation "R600U; 5 MM" from Illbruck, Inc.;

F4: A polyurethane blown micro fiber web, 70 grams per square meter basis weight;

F5: An electrostatically charged staple fiber web, 100 grams per square meter basis weight, commercially available under the trade designation "FILTRETE G100" from 3M Company;

F6: electrostatically charged staple fiber web "F5", wherein 2 percent of its overall surface area uniformly point bonded using ultrasonic welding;

F7: An electrostatically charged staple fiber web, 200 grams per square meter basis weight, commercially available under the trade designation "FILTRETE G200" from 3M Company;

Sample Preparation

The following abbreviations are used to describe the filter-abrasive laminate:

L1 and L5 are the abrasive and loop attachment media respectively, the latter for fastening to a backup pad;

L2 and L4 are the filter media laminated to L1 and L5 respectively in a 4-layer construction;

L3 is the filter media laminated between filter media L2 and L4 in a 5-layer construction;

C is the cavity media laminated between filter media L2 and L4 in a 5-layer construction.

4-layer Laminate 2.5 grams milligrams per square centimeter of "SUPER 77 SPRAY ADHESIVE", commercially available from 3M Company, St Paul, Minn., was applied to both sides of the cavity structure C, then it was laminated to the planar surface of a loop attachment material, commercially available under the trade designation "70 G/M$^2$ TRICOT DAYTONA BRUSHED NYLON LOOP FABRIC" from Sitip SpA, Gene, Italy, at 25 degrees celsius. The same process was then used to laminate a filter media to the cavity media, followed by a third lamination step that applied the abrasive media to the filter media. After drying for 2 hours at 25 degrees celsius the laminate was die-cut into 5-inch (12.7 cm) diameter samples.

5-Layer Laminate

The process described for the 4-layer laminate was repeated, wherein the filter and cavity media were laminated together in a similar fashion with the "SUPER 77 SPRAY ADHESIVE" prior to laminating to the abrasive media.

Rigid Cavity-Filter Laminate

The process described for the 5-layer laminate was repeated, wherein three filter media were laminated in the sequence L4 to L5, C to L4 and L2 to C, prior to the abrasive lamination step.

Soft Cavity-Filter Laminate

The process described for the 4-layer laminate was repeated, wherein three filter media were laminated in the sequence C to L5 and L2 to C, prior to the abrasive lamination step.

Soft Filled Cavity-Filter Laminate

The process described for the 5-layer laminate was repeated, wherein three filter media were laminated in the sequence L4 to L5, C to L4 and L2 to C, prior to the abrasive lamination step.

Sanding Test 1

A 5-inch (12.7 centimeter) sample disc was attached to a 5-inch (12.7 centimeter) diameter by ⅜-inch (0.95 centimeter) thick foam back up pad, available under the trade designation "Dynabrade Back-Up Pad model "56320" from Dynabrade Corporation, Clarence, N.Y. The backup pad and disc assembly was weighed, then mounted onto a dual-action orbital sander, model "21038", obtained from Dynabrade Corporation, Clarence, N.Y. The central dust extraction vacuum line was detached from the sander.

The abrasive face of the disc was brought into contact with a pre-weighed 18-inch by 30 inch (45.7 by 76.2 centimeters) gel-coated fiberglass reinforced plastic panel, from Whitebear Boatworks, White Bear Lake, Minn. The sander was run at 91.5 pounds per square inch (630.9 kilopascals (Kpa)) air line pressure and a down force of 15 pounds force (66.7 N) for 45 seconds. An angle of zero degrees to the surface of the workpiece was used. Each test consisted of 24 overlapping transverse passes, 21 inches (53.3 centimeter) in length, resulting in an evenly sanded 18 by 26 inch (45.7 by 66.0 centimeters) area of test panel. Tool motion over the face of the panel was at a rate of 5 inches/sec. (12.7 centimeters per second) for both X and Y directions. Total travel length was 517 inches (13.13 meters). After the final sanding pass, the test panel and sample with backup pad were re-weighed. The test panel was then cleaned and weighed again. After removing the sample, the backup pad and tool were cleaned in preparation for another test.

Sanding Test 2

The procedure for Sanding Test 2 was similar to Sanding Test 1 except that 4 sets of 6 passes of 21 inches (53.3 centimeters) each was used instead of 1 set of 24 passes. Total travel length was 556 inches (14.12 meter).

The following measurements were made per each test and reported as an average:

"Cut": weight, in grams, removed from the test panel.

"Retain": weight, in grams, of swarf captured in the sample with the backup pad attached.

"Surface": weight, in grams, of swarf remaining on the test panel surface.

"Lost": weight, in grams, of swarf that was unaccounted for and not contained in the value for "Retain" nor in the value for "Surface".

"Capture Percent": ratio of "Retain" over "Cut"

Examples 1 Through 13

Examples 1-13 were prepared according to the cavity laminates methods. Specific constructions and sanding test results are listed in Table 1.

TABLE 1

| Example | L1 | L2 | Cavity Laminate C | L4 | Cavity Type | Sanding Test | Sample Size | Cut (grams) | Retain (grams) | Surface (grams) | Lost (grams) | Capture % |
|---|---|---|---|---|---|---|---|---|---|---|---|---|
| 1 | A2 | F1 | C1 | F5 | Soft-Filled | 2 | 1 | 5.33 | 5.09 | 0.18 | 0.06 | 95.5 |
| 2 | A2 | F1 | F3 | F5 | Soft-Filled | 2 | 2 | 5.92 | 5.58 | 0.17 | 0.18 | 94.2 |
| 3 | A2 | F1 | C4 | F3 | Soft-Filled | 2 | 3 | 6.27 | 5.90 | 0.17 | 0.20 | 94.1 |
| 4 | A2 | F1 | C11 | F3 | Soft-Filled | 2 | 1 | 4.95 | 4.60 | 0.18 | 0.17 | 92.9 |
| 5 | A2 | F1 | C4 | F5 | Soft-Filled | 2 | 1 | 5.87 | 5.27 | 0.17 | 0.43 | 89.8 |
| 6 | A2 | F1 | C6 | F3 | Rigid | 2 | 1 | 6.13 | 5.66 | 0.32 | 0.15 | 92.3 |
| 7 | A2 | F1 | C7 | F3 | Rigid | 2 | 1 | 6.09 | 5.60 | 0.29 | 0.20 | 92.0 |
| 8 | A2 | F1 | C5 | F3 | Rigid | 2 | 2 | 6.68 | 5.96 | 0.19 | 0.54 | 89.1 |
| 9 | A2 | F1 | C9 | F3 | Rigid | 2 | 1 | 5.90 | 4.87 | 0.14 | 0.89 | 82.5 |
| 10 | A2 | F1 | C8 | F3 | Rigid | 2 | 1 | 5.57 | 4.38 | 0.22 | 0.97 | 78.6 |
| 11 | A2 | F1 | C10 | F5 | Rigid | 2 | 1 | 5.67 | 3.70 | 0.56 | 1.41 | 65.3 |
| 12 | A2 | F1 | C2 | — | Soft | 2 | 1 | 6.25 | 5.14 | 0.15 | 0.96 | 82.2 |
| 13 | A2 | F1 | C3 | — | Soft | 2 | 1 | 6.52 | 5.28 | 0.18 | 1.06 | 81.0 |

Comparatives A Through K

Comparatives A through K were prepared according to the 4-layer laminate method. Specific constructions and sanding test results are listed in Table 2.

TABLE 2

| Comparative | Filter Laminate L1 | L2 | L4 | Sand Test | Sample Size | Cut (grams) | Retain (grams) | Surface (grams) | Lost (grams) | Capture % |
|---|---|---|---|---|---|---|---|---|---|---|
| A |  | A2 | F2 | F5 | 2 | 2 | 6.36 | 5.87 | 0.20 | 0.28 | 92.3 |
| B |  | A3 | F1 | F5 | 2 | 1 | 5.80 | 5.35 | 0.17 | 0.28 | 92.2 |
| C |  | A2 | F1 | C1 | 2 | 1 | 5.74 | 5.13 | 0.27 | 0.34 | 89.4 |
| D |  | A3 | F1 | F7 | 2 | 1 | 5.67 | 5.08 | 0.20 | 0.39 | 89.6 |
| E |  | A2 | F1 | F3 | 2 | 1 | 5.72 | 4.89 | 0.06 | 0.77 | 85.5 |
| F |  | A3 | F1 | F3 | 2 | 1 | 6.09 | 4.76 | 0.31 | 1.02 | 78.2 |
| G |  | A2 | F1 | F3 | 2 | 4 | 5.20 | 4.72 | 0.13 | 0.35 | 90.7 |
| H |  | A2 | F1 | F6 | 2 | 13 | 4.91 | 4.52 | 0.14 | 0.25 | 92.4 |
| I |  | A2 | F1 | F6 | 1 | 7 | 4.93 | 4.47 | 0.12 | 0.33 | 91.0 |
| J |  | A2 | F3 | F1 | 2 | 1 | 5.57 | 4.42 | 0.25 | 0.90 | 79.4 |
| K |  | A3 | F3 | F1 | 2 | 1 | 6.24 | 3.54 | 0.37 | 2.33 | 56.7 |

(Note: L1 column is empty for all rows; data begins at L2.)

Comparatives L-N

Examples L, M and N were prepared according to the 5-layer laminate method. Specific constructions and sanding test results are listed in Table 3.

TABLE 3

| Comparative | Filter Laminate L1 | L2 | L3 | L4 | L5 | Sand Test | Sample Size | Cut (grams) | Retain (grams) | Surface (grams) | Lost (grams) | Capture % |
|---|---|---|---|---|---|---|---|---|---|---|---|---|
| L |  | A2 | F1 | AT1 | F7 | AT1 | 1 | 1 | 3.08 | 2.79 | 0.19 | 0.10 | 90.6 |
| M |  | A2 | F1 | F6 | F4 | AT1 | 1 | 2 | 5.26 | 4.94 | 0.15 | 0.18 | 93.7 |
| N |  | A2 | F1 | F6 | F3 | AT1 | 1 | 5 | 4.96 | 4.52 | 0.15 | 0.28 | 91.2 |

Comparatives O-T

Abrasives A1, A3 and A4 without lamination to either the filter media or the loop attachment material, were used as Comparatives. Sanding test results are listed in Table 4.

TABLE 4

| Comparative | Abrasive | Sanding Test | Cut (grams) | Retain (grams) | Surface (grams) | Lost (grams) | Capture % |
|---|---|---|---|---|---|---|---|
| O | A1 | 1 | 2.92 | 0.78 | 0.26 | 1.88 | 26.7 |
| P | A1 | 1 | 3.10 | 0.51 | 0.20 | 2.39 | 16.5 |
| Q | A4 | 1 | 5.82 | 0.47 | 0.06 | 5.29 | 8.1 |
| R | A4 | 1 | 6.37 | 0.49 | 0.24 | 5.64 | 7.7 |
| S | A3 | 1 | 7.81 | 0.32 | 0.18 | 7.31 | 4.1 |
| T | A3 | 1 | 7.55 | 0.30 | 0.14 | 7.11 | 4.0 |

It is to be understood that even in the numerous characteristics and advantages of the abrasive filter assembly of the present disclosure set forth in above description and examples, together with details of the structure and function of the invention, the disclosure is illustrative only. Changes can be made to detail, especially in matters of shape, size and arrangement of the filter media layers and methods of making and using within the principles of the invention to the full extent indicated by the meaning of the terms in which the appended claims are expressed and the equivalents of those structures and methods.

What is claimed is:

1. An abrasive filter assembly comprising:

a porous element comprising a first surface, a second surface opposite said first surface, and a plurality of openings extending from said first surface to said second surface of said porous element;

a first filter media having a first surface and a second surface opposite said first surface, said first surface of said first filter media proximate said second surface of said porous element, said first filter media comprising a plurality of discrete channels formed by a plurality of channel sidewalls, said channels extending from said first surface of said first filter media to said second surface of said first filter media, a second filter media having a first surface and a second surface opposite said first surface, said first surface of said second filter media proximate said second surface of said first filter media;

an attachment interface layer proximate said second surface of said second filter media;

and at least one cavity located between said first surface of said first filter media and said attachment interface layer, said cavity comprises an open area of at least 1 square centimeter;

wherein said openings cooperate with said channels and said cavity to allow the flow of particles from said first surface of said porous element to said second filter media.

2. The abrasive filter assembly of claim 1 wherein said porous element comprises a porous abrasive layer.

3. The abrasive filter assembly of claim 2 wherein said porous element porous abrasive layer is selected from the group consisting of a perforated coated abrasive, a screen abrasive, and a nonwoven abrasive.

4. The abrasive filter assembly of claim 1 wherein said porous element is an abrasive attachment interface selected from the group consisting of a loop portion of a two-part mechanical engagement system, a hook portion of a two-part mechanical engagement system, an adhesive attachment surface, and combinations thereof.

5. The abrasive filter assembly of claim 1 wherein said first filter media has a height in the range of 1 to 20 millimeters.

6. The abrasive filter assembly of claim 1 wherein said channel sidewalls comprise polymer film.

7. The. abrasive filter assembly of claim 6 wherein said polymer film comprises a polymer selected from the group consisting of polypropylene, polyethylene, polytetrafluoroethylene, and combinations thereof.

8. The abrasive filter assembly of claim 6 wherein said polymer film comprises a structured surface.

9. The abrasive filter assembly of claim 6 wherein said polymer film comprises an electrostatic charge.

10. The abrasive filter assembly of claim 1 wherein said plurality of channels comprise an average effective circular diameter of at least 0.1 millimeter.

11. The abrasive filter assembly of claim 1 wherein said second filter media comprises a nonwoven filter.

12. The abrasive filter assembly of claim 11 wherein said nonwoven comprises polyolefin fibers and has a basis weight in the range of 10 to 200 grams per square meter.

13. The abrasive filter assembly of claim 1 wherein said first filter media comprises said at least one cavity.

14. The abrasive filter assembly of claim 1 further comprising a cavity layer comprising said at least one cavity.

15. The abrasive filter assembly of claim 1 wherein said at least one cavity comprises an effective circular diameter of at least 5 millimeters.

16. The abrasive filter assembly of claim 1 wherein said at least one cavity comprises an effective circular diameter of at least 10 millimeters.

17. The abrasive filter assembly of claim 1 wherein said at least one cavity is at least partially filled with a filter media.

18. The abrasive filter assembly of claim 1 further comprising a third filter media positioned between said porous element and said first filter media.

19. The abrasive filter assembly of claim 1 wherein said attachment interface layer is a pressure sensitive adhesive.

20. The abrasive filter assembly of claim 1 wherein said attachment interface comprises a loop portion or a hook portion of a two-part mechanical engagement system.

21. A method of abrading a surface comprising contacting said surface with an abrasive filter assembly according to claim 2, and relatively moving said abrasive filter assembly and said surface to mechanically modify said surface.

22. An abrasive filter assembly comprising:

a porous element comprising a first surface, a second surface opposite said first surface, and a plurality of openings extending from said first surface to said second surface of said porous element;

a first filter media having a first surface and a second surface opposite said first surface, said first surface of said first filter media affixed to said second surface of said porous element, said first filter media comprising a plurality of channels formed by a plurality of polymer films configured as a stack and affixed to one another, said channels extending from said first surface of said first filter media to said second surface of said first filter media;

a second filter media having a first surface and a second surface opposite said first surface, said first surface of said second filter media proximate said second surface of said first filter media;

an attachment interface layer proximate said second surface of said second filter media;

and at least one cavity located between said first surface of said first filter media and said attachment interface layer;

wherein said openings cooperate with said channels and said cavity to allow the flow of particles from said first surface of said porous element to said second filter media.

23. The abrasive filter assembly of claim 22 wherein said porous element comprises a porous abrasive layer.

24. The abrasive filter assembly of claim 23 wherein said porous element porous abrasive layer is selected from the group consisting of a perforated coated abrasive, a screen abrasive, and a nonwoven abrasive.

25. The abrasive filter assembly of claim 22 wherein said porous element is an abrasive attachment interface selected from the group consisting of a loop portion of a two-part mechanical engagement system, a hook portion of a two-part mechanical engagement system, an adhesive attachment surface, and combinations thereof.

26. The abrasive filter assembly of claim 22 wherein said first filter media has a height in therange of 1 to 20 millimeters.

27. The abrasive filter assembly of claim 22 wherein said at least one cavity comprises an effective circular diameter of at least 2 millimeters.

28. The abrasive filter assembly of claim 22 wherein said at least one cavity comprises an effective circular diameter of at least 10 millimeters.

29. The abrasive disk of claim 22 wherein said plurality of polymer films comprises a polymer selected from the group consisting of polypropylene, polyethylene, polytetrafluoroethylene, and combinations thereof.

30. The abrasive disk of claim 22 wherein said polymer film comprises a structured surface.

31. The abrasive disk of claim 22 wherein said polymer film comprises an electrostatic charge.

32. The abrasive disk of claim 22 wherein said plurality of channels comprise an average effective circular diameter of at least 0.1 millimeter.

33. A method of abrading a surface comprising contacting said surface with an abrasive filter assembly according to claim 23, and relatively moving said abrasive filter assembly and said surface to mechanically modify said surface.

* * * * *

UNITED STATES PATENT AND TRADEMARK OFFICE
CERTIFICATE OF CORRECTION

PATENT NO. : 7,393,269 B2 Page 1 of 1
APPLICATION NO. : 11/228896
DATED : July 1, 2008
INVENTOR(S) : Thomas W. Rambosek It is certified that error appears in the above-identified patent and that said Letters Patent is hereby corrected as shown below:

<u>Column 15</u>
Line 4, after "2.5" delete "grams".
Line 6, delete "St" and insert -- St. -- therefor.

<u>Column 19</u>
Line 25, In Claim 7, delete "The." and insert -- The -- therefor.

<u>Column 20</u>
Line 17, In Claim 22, delete "suiface" and insert -- surface -- therefor.
Line 25, In Claim 22, delete "filler" and insert -- filter -- therefor.
Line 40, In Claim 26, delete "therange" and insert -- the range -- therefor.

Signed and Sealed this

Twenty-seventh Day of January, 2009

JOHN DOLL
*Acting Director of the United States Patent and Trademark Office*